United States Patent
Radza et al.

(10) Patent No.: US 7,522,089 B2
(45) Date of Patent: Apr. 21, 2009

(54) AIRBORNE LOOK-DOWN DOPPLER RADAR TRACKING OF HOVERING HELICOPTERS USING ROTOR FEATURES

(75) Inventors: Bernard Radza, Tucson, AZ (US); Joseph Henning, Tucson, AZ (US); Sunny Ali, Tucson, AZ (US); John Mincer, Tucson, AZ (US); Randal Walters, Green Valley, AZ (US)

(73) Assignee: Raytheon Company, Waltham, MA (US)

( * ) Notice: Subject to any disclaimer, the term of this patent is extended or adjusted under 35 U.S.C. 154(b) by 277 days.

(21) Appl. No.: 11/423,590

(22) Filed: Jun. 12, 2006

(65) Prior Publication Data

US 2007/0285303 A1  Dec. 13, 2007

(51) Int. Cl.
 *G01S 7/41* (2006.01)
 *G01S 13/72* (2006.01)
 *F41G 7/20* (2006.01)

(52) U.S. Cl. .............. 342/62; 342/90; 342/91; 342/93; 342/95; 342/159; 342/160; 342/162

(58) Field of Classification Search .............. 342/62
 See application file for complete search history.

(56) References Cited

U.S. PATENT DOCUMENTS

| | | | |
|---|---|---|---|
| 4,275,395 A | 6/1981 | Jacomini | |
| 4,275,396 A * | 6/1981 | Jacomini | 342/93 |
| 4,346,382 A * | 8/1982 | Bosc et al. | 342/192 |
| 4,389,647 A * | 6/1983 | Fanuele et al. | 342/192 |
| 4,490,719 A | 12/1984 | Botwin et al. | |
| 4,641,138 A * | 2/1987 | Opitz | 342/192 |
| 5,055,848 A * | 10/1991 | Rotgans | 342/90 |
| 5,070,335 A | 12/1991 | Lewis et al. | |
| 5,081,459 A * | 1/1992 | Guillerot et al. | 342/90 |
| 5,124,710 A | 6/1992 | Debuisser | |
| 5,231,402 A * | 7/1993 | Ludloff et al. | 342/192 |
| 5,347,282 A | 9/1994 | La Grange et al. | |
| 5,376,940 A | 12/1994 | Abatzoglou | |
| 5,416,488 A * | 5/1995 | Grover et al. | 342/159 |
| 5,689,268 A | 11/1997 | Shi et al. | |
| 6,411,251 B2 * | 6/2002 | Stanek et al. | 342/90 |
| 6,573,861 B1 * | 6/2003 | Hommel et al. | 342/192 |
| 6,818,883 B2 | 11/2004 | Rockinger et al. | |
| 7,079,072 B1 * | 7/2006 | Abatzoglou | 342/90 |
| 2004/0239556 A1 | 12/2004 | Nagel | |

\* cited by examiner

*Primary Examiner*—Thomas H Tarcza
*Assistant Examiner*—Matthew M Barker
(74) *Attorney, Agent, or Firm*—The Noblitt Group, PLLC

(57) ABSTRACT

A system and method is presented for detecting and classifying slow-moving and hovering helicopters from a missile's look-down Doppler radar that is compatible with the existing base of Doppler radars. This approach uses definable attributes of a helicopter rotor assembly and its extended Doppler rotor return to differentiate "rotor samples" from other samples (steps 123, 125), extract features such as bandwidth, activity, angle, and shape from the rotor samples (step 127), and classify a potential target as a helicopter or other based on the extracted rotor features and the known attributes of the helicopter rotor assembly (step 129). A target report including a classification target, range, range-rate, and angle of the extended rotor return is suitably passed to a tracking processor (step 121).

29 Claims, 8 Drawing Sheets

AIRBORNE LOOK-DOWN DOPPLER RADAR TRACKING OF HOVERING HELICOPTERS USING ROTOR FEATURES

BACKGROUND OF THE INVENTION

1. Field of the Invention

This invention relates to airborne look-down Doppler radars and, more particularly, to a system and method for extracting rotor features from a Doppler radar to track hovering helicopters.

2. Description of the Related Art

The significance of the helicopter threat continues to grow as U.S. interests are challenged in austere, worldwide locations by conventional forces and terrorist organizations employing unconventional, asymmetric means of warfare. Without an ability to field a conventional air force, adversaries place greater emphasis on the wide range of missions which can be conducted by a relatively inexpensive helicopter force. The helicopter is a particularly difficult target for air- or surface-launched missiles that use airborne look-down Doppler radars. Speeds that range from over 200 knots to a hover, extremely low-altitude flight, an ability to terrain mask or hide using terrain features and an ability to employ a wide variety of lethal ordnance are some of a helicopter's challenging characteristics. Ground-launched missiles that employ look-up thermal detection are a significant threat to hovering or slow-moving helicopters. However, such capability is not always available in the theater of operations when and where they are needed. Furthermore, shoulder-launched missiles are less effective against fast-moving helicopters. At present, the ability to effectively counter helicopters is less than robust.

As shown in FIG. 1a, a surface- or air-launched missile 10 employs a look-down Doppler radar ("seeker 11") to transmit an electromagnetic signal 12, typically an X-band radio wave, towards a hostile helicopter 14 and processes the return signal to detect, identify, and track the helicopter. The seeker is typically a pulsed radar which uses range gates and Doppler filters to observe targets at different ranges and Doppler. Alternately, a continuous-wave (CW) radar might be used. A conventional CW radar only provides Doppler information, but it can be modified to provide range information.

The clutter area $A_c$ for the range gate in which the helicopter is located is given by:

$$A_c \approx R\theta_{3dB} \frac{c\tau}{2} \sec\psi_g$$

Where R is the range from the seeker to earth along a main axis of beam 12, $\theta_{3DB}$ is the antenna's 3 dB beam width, c is the speed of light, $\tau$ is the pulse width, and $\psi_g$ is the incident grazing angle measured from the earth's surface to the main axis of beam 12.

The signal-to-clutter ratio of the electromagnetic return from the clutter area $A_c$ including the helicopter is given by:

$$\text{Signal-to-Clutter Ratio} \propto \frac{\sigma_{helicopter}\cos\psi_g}{\sigma_{ground}\theta_{3dB}Rc\tau}$$

Where $\sigma_{helicopter}$ is the helicopter radar cross-section (RCS) and $\sigma_{ground}$ are the ground reflection coefficients at the incident grazing angle.

Target detection and identification is based on analyzing the properties of a received signal. These properties (from the easiest to most difficult) are: signal amplitude, target angle, target range, target speed along the line-of-sight (Doppler shift), target speed across the line-of-sight, and target shape. As shown in FIG. 1b, a hovering or slow-moving helicopter is very difficult to intercept with a look-down radar because its body Doppler 16 has merged with ground clutter 18. The Doppler extent 20 (width of the Doppler spectrum) of ground clutter is determined by the motions of the seeker and the illuminating aperture.

Conventional seekers usually sample return signals and attempt to exclude returns from the ground or other undesirable returns. A target can be detected when the return samples exceed the system noise by a sufficient margin. For example, the seeker maintains a desired constant false-alarm rate (CFAR) by changing the false-alarm threshold T1 to an optimum value that varies over time. Once a possible target is detected, the seeker uses more-sophisticated processing to try to classify the body Doppler and determine the range and range-rate of the target. Once a target is positively identified, its range and range-rate are passed to a tracking processor which guides the missile during the terminal guidance phase to impact the target.

If the target is an airplane or fast-moving helicopter, its body Doppler 16 is shifted away from ground clutter, and its signal-to-clutter ratio is high enough for standard techniques to be effective. A hovering helicopter's body Doppler, however, has merged with clutter and only the return 26 of its rotor assembly 28 extends outside of clutter (due to the rotation of the rotor assembly). Even if the helicopter were moving, different flight geometries could put the helicopter's body Doppler within the clutter region. If a seeker tries to estimate the range and range-rate of the rotor return, it will find conflicting range-rate measurements since the rotor return constantly changes with time and scintillates (both in amplitude and angle). Thus, the seeker will disregard a majority of the helicopter's rotor return, and the rotor return samples will not be used to classify the potential target as a helicopter.

There remains a need for a robust technique for detecting and classifying hovering and slow-moving helicopters that is compatible with the existing base of Doppler radars.

SUMMARY OF THE INVENTION

The present invention provides a system and method for detecting and classifying slow-moving and hovering helicopters from a missile's look-down Doppler radar that is compatible with the existing base of Doppler radars.

This is accomplished by a missile radar which receives radar returns, processes the returns to create a 1-D Doppler profile or 2-D Range-Doppler Map ("Doppler Map"), and distinguishes a helicopter's extended rotor return from both clutter and body returns. The Doppler map contains both amplitude and Doppler shift information. If the missile detects a potential target in the Doppler map, it will typically try to classify the potential target using conventional body Doppler techniques. If the body Doppler fails to classify the target or is inconclusive, "rotor samples" are identified from the samples within the extended rotor return. To facilitate identification, search window(s) are suitably modified to exclude clutter and body return and capture the maximum Doppler shift of the rotor assembly.

The extended rotor return is not merged with clutter because the rotor assembly rotates at a sufficiently high rate to produce a significant Doppler shift. Performance may be improved by using a pulsed-radar with a medium pulse repetition frequency (PRF) which eliminates ground clutter in other range gates in the Range-Doppler Map from being integrated into the Doppler filters for the range gate that includes the potential target while maintaining sufficient Doppler resolution. The samples within the modified search window(s) are compared to a threshold T2 set an increment above, for example, the CFAR threshold T1 which is referenced to the noise floor of the system and a threshold T3 below the body return (if available) to identify rotor samples. The rotor assembly has an RCS that is sufficiently large and well-defined with respect to the helicopter body RCS, and the thresholds can be set to effectively exclude noise or most non-rotor samples.

The missile then extracts "rotor features" such as bandwidth, activity angle, and shape. Since all helicopter rotors rotate at roughly the same speed with varying Doppler, Doppler bandwidth can be used as a discriminator between helicopter and non-helicopter returns. Activity is a measure of the density of the samples in the search window(s) which are identified as "rotor samples". Activity is typically a large fractional value for a helicopter. In typical Doppler radars, each return sample has an associated angle. If a large fraction of the radar samples originate from the same point in space, there is a further indication that the potential target is a helicopter. The extended rotor return also has a unique shape. If the radar has sufficient Doppler resolution, the shape may be extracted and used to discriminate helicopters. A particular seeker may implement one or more of these or other "rotor features". The seeker classifies the potential target as a helicopter or other based on the extracted rotor features and known attributes of a helicopter rotor assembly. Once a potential target is classified as a helicopter, the seeker suitably calculates a target report consisting of a classification tag, range, range-rate, and angle estimates. These estimates allow the seeker to successfully guide to and track the helicopter.

These and other features and advantages of the invention will be apparent to those skilled in the art from the following detailed description of preferred embodiments, taken together with the accompanying drawings, in which:

DETAILED DESCRIPTION OF THE INVENTION

The present invention describes a system and method for detecting and classifying slow-moving and hovering helicopters from a missile's look-down Doppler radar that is compatible with the existing base of Doppler radars. This approach uses definable attributes of a helicopter rotor assembly and its extended Doppler rotor return to (a) differentiate "rotor samples" from other samples, (b) extract features such as bandwidth activity, angle, and shape from the rotor samples, (c) classify a potential target as a helicopter or other based on the extracted rotor features and the known attributes of the helicopter rotor assembly. Once classified, a target report including a helo classification tag, range, range-rate and angle is suitably passed to the tracking processor.

Figure 1A:
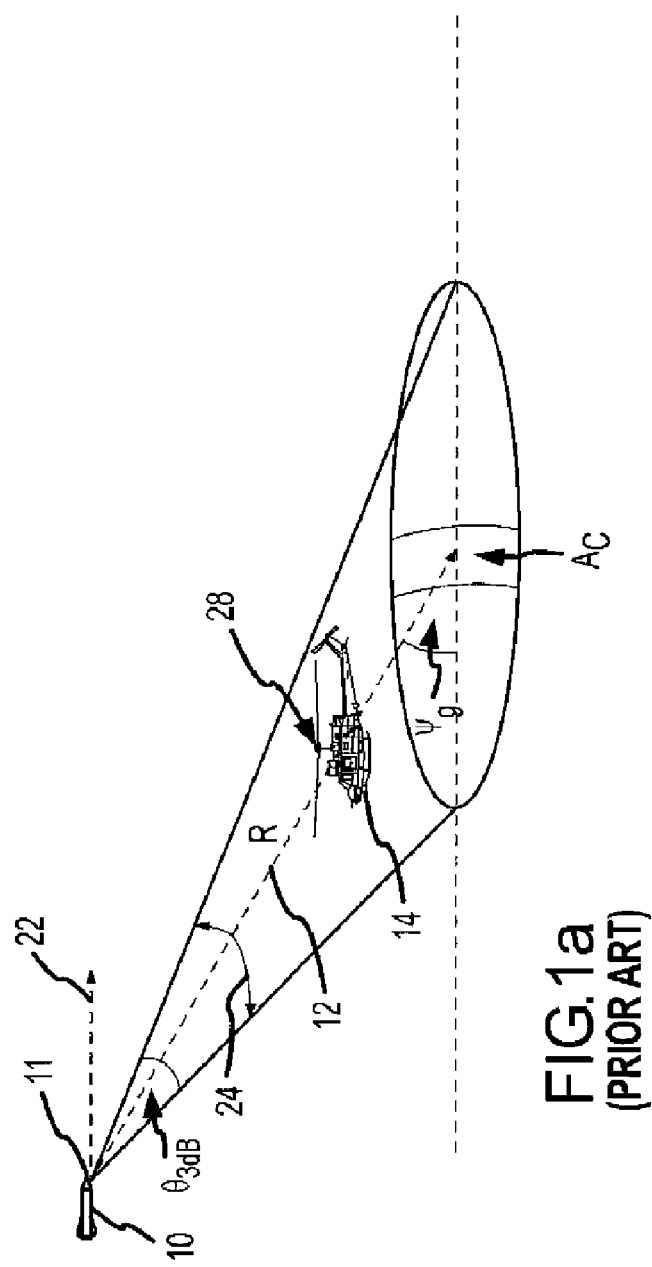
FIGS. 1a and 1b, as described above, are a diagram of an airborne look-down radar that is illuminating a helicopter and a Doppler profile of the return signal, respectively.
Figure 1B:
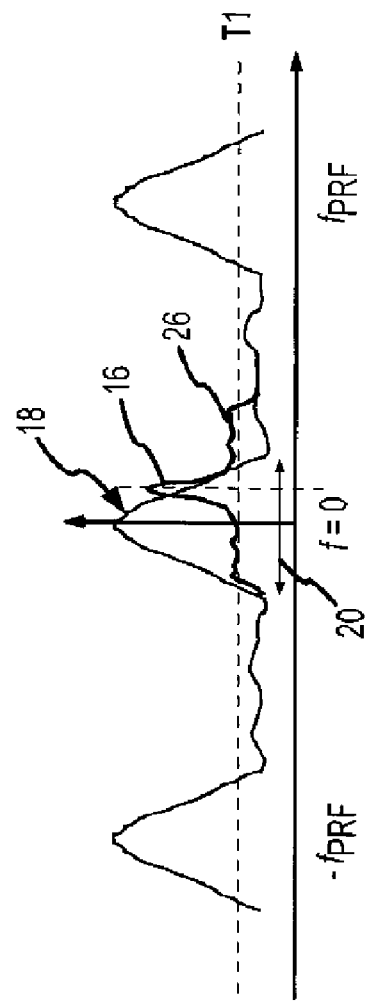
Figure 2A:
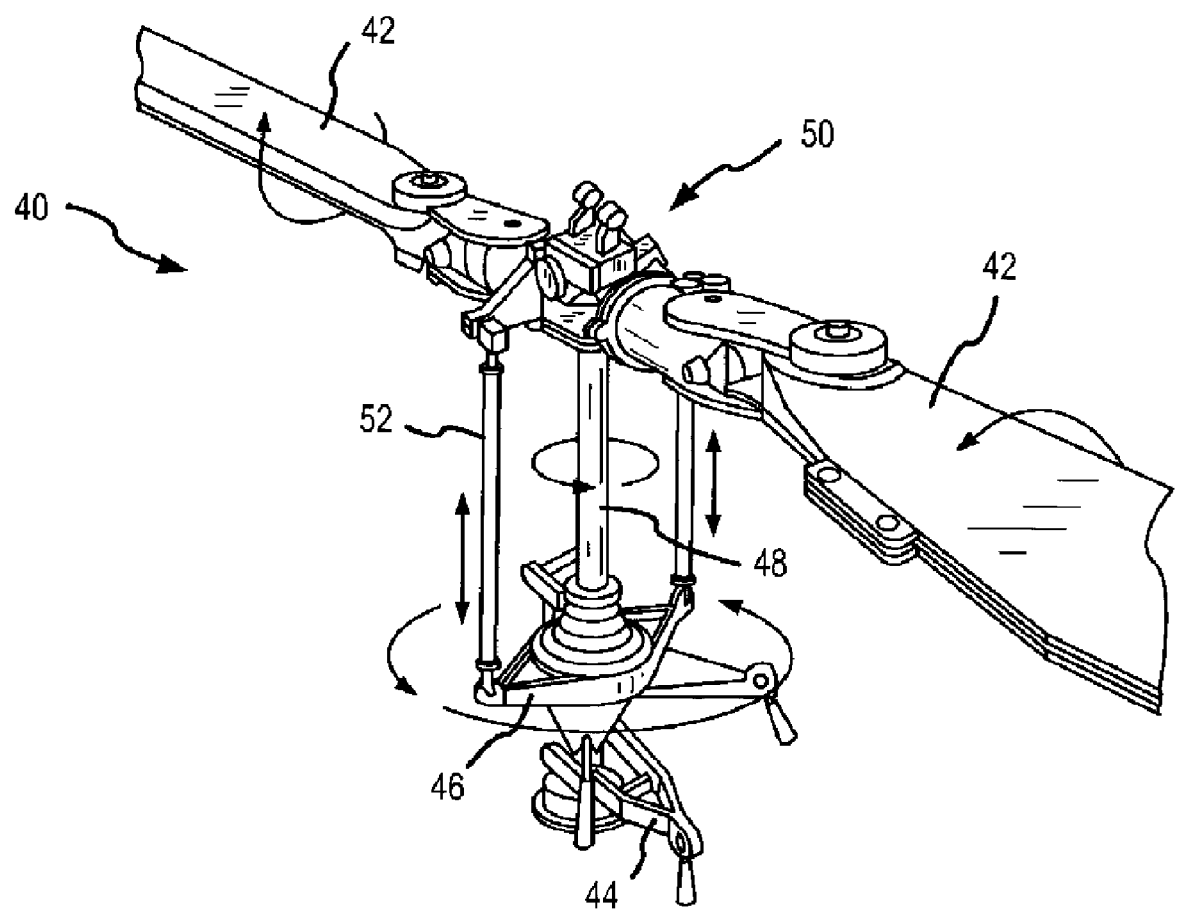
FIGS. 2a and 2b are a diagram of a helicopter rotor structure and its extended Doppler return, respectively.

As shown in FIG. 2a, a typical two-bladed helicopter rotor assembly 40 provides a helicopter with the power necessary to rotate main rotor blades 42, generate lift and thrust, and to move laterally, turn, and change altitude. The swash plate assembly, consisting of a fixed plate 44 and a rotating plate 46, changes the attack angle of the rotor blades and controls the motion of the helicopter via the helicopter's collective and cyclic controls. The rotor blades connect to the rotor shaft 48 at the rotor hub 50, and the pitch control rods 52 allow the rotating, wash plate to change the pitch of the rotor blades. Rotor blades are airfoils with a very high aspect ratio; their pitch is constantly changing as they rotate to control the magnitude and direction of the thrust vector, and they are often fully articulated. They are allowed to flap, feather, and lead or lag independently of each other.

Figure 2B:
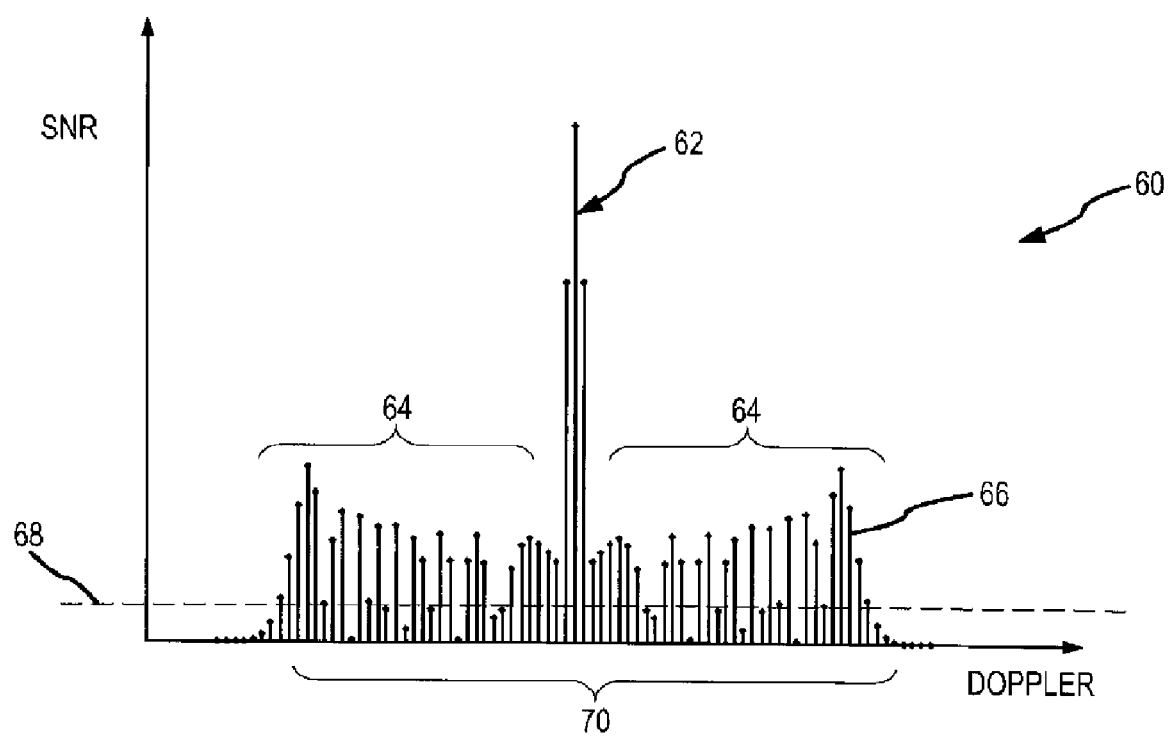

As shown in FIG. 2b, a Doppler profile 60 of a helicopter (no ground or other clutter) includes a body Doppler return 62 having a Doppler shift corresponding to the velocity of the helicopter and an extended rotor return 64 on either side of the body return. This is a mathematical Doppler profile of a two-bladed helicopter rotor. It is a dipole example, and the peaks at the edges of the Doppler profile occur because one dominant scatterer was modeled. Many factors contribute to the shape of a real helicopter's Doppler profile, including electromagnetic wave interactions from many individual scatterers, and a real profile may not exhibit a more complex shape.

Advancing and retreating rotor elements continually change their relative speeds with respect to the radar and create a unique frequency spectrum. The extended rotor return is typically several kHz wide. A "rotor scatterer" is defined as the electromagnetic reflections from the structure extending from the center of the rotor assembly out to the point where the rotor blades attach, a distance of typically about one meter. The tangential velocity v and Doppler D for a rotor scatterer are given by $v=r\omega$ and $D=(2v/\lambda)\sin(\theta)$ where r is the scatter radius from the center of rotation, $\omega$ is the rotational rate, $\lambda$ is the radar wavelength and $\theta$ is the instantaneous solid angle from the radar line-of-sight to the scatter velocity vector. For a 0.8 Mach tip speed and 8 m radius, the typical rotation rate is 39 rad/sec. For example, a one meter radius produces a Doppler around ±2.5 kHz for each revolution at X-band. Smaller radii correspond to a smaller Doppler. For equivalent radii, the Doppler shift is larger in the Ku-band and larger yet in the Ka-band. Another important attribute is that unlike the body Doppler return, the RCS of a rotor scatterer does not change with intercept azimuth angle.

The extended rotor return may be characterized by a number of distinctive "rotor features" such as bandwidth, activity, angle, and shape. The rotor assembly has an RCS that is sufficiently large and sufficiently well-defined with respect to the helicopter RCS. Therefore, rotor samples 66, each corresponding to a different Doppler cell, will typically lie well above the system noise floor 68 and in an amplitude range with respect to the body Doppler, typically 12-15 dB down from the peak body return. Other noise samples may lie below the noise floor.

Since helicopter rotors rotate at roughly the same speed, typically mach 0.75-0.84, with varying Doppler, Doppler bandwidth 70 can be used as a discriminator between helicopter/non-helicopter returns. The bandwidth can be measured as the difference between the rotor sample having the maximum Doppler shift and the rotor sample having the minimum Doppler shift. Activity is a measure of the density of samples in the search window(s) that are identified as "rotor samples". Since activity is a large fractional value, typically greater than 80%, for a helicopter, it can also be used as a discriminator. In typical Doppler radars, each return sample has an associated angle. If a large fraction of the radar samples originate from the same point in space, there is a further indication that the potential target is a helicopter. The extended rotor return also has a unique shape. It can be used to discriminate helicopters provided the radar has sufficient Doppler resolution.

If there is no clutter (e.g. the missile is looking up at the helicopter) or if the helicopter is moving fast, conventional Doppler processing will detect the helicopter and initiate tracking. Therefore, the proposed approach is particularly applicable when the helicopter is hovering or the body Doppler is partially-obscured by ground clutter. In either case, conventional detection is impossible or at best unreliable. Ground clutter also obfuscates the ideal extended rotor return 64 shown in FIG. 2b, which makes feature extraction more difficult. For the approach to be robust, it is not only important to identify features such as bandwidth, activity, angle, and shape to effectively discriminate helicopters, but it is important to accurately extract those features within a noisy or cluttered spectrum.

Figure 3:
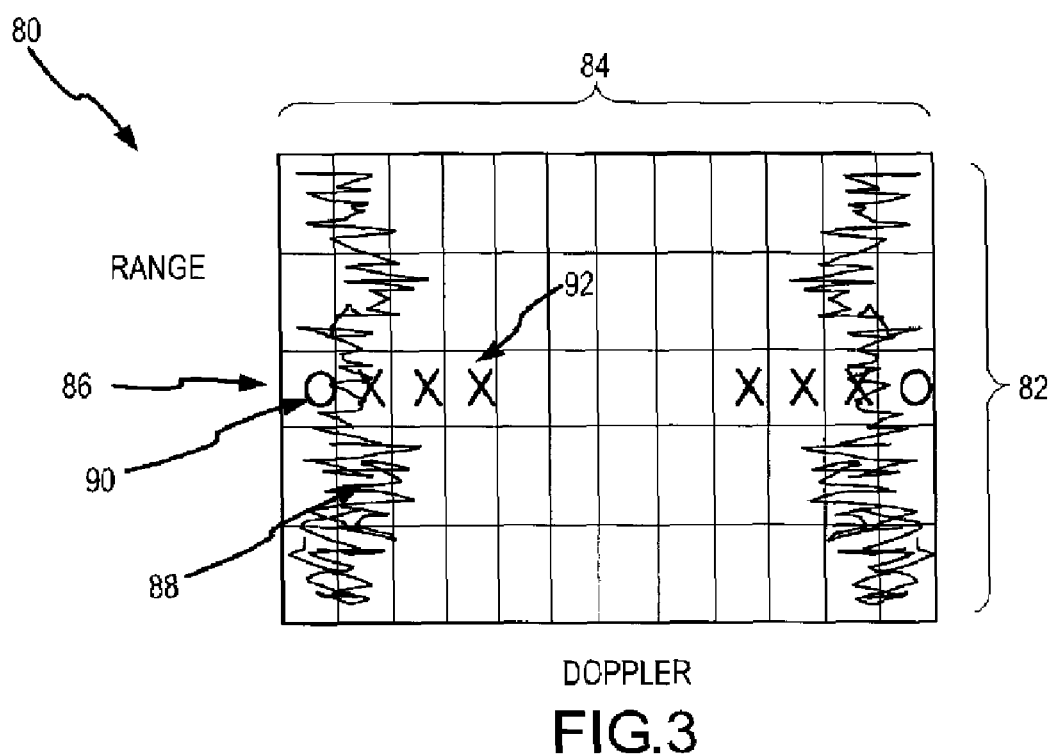
FIG. 3 is a Range-Doppler Map (RDM) of a hovering helicopter in which the extended rotor return is distinguishable from the Doppler of the helicopter body and ground clutter.

FIG. 3 is an example of an RDM 80 for a pulsed Doppler radar in which the helicopter's body Doppler is completely merged with ground clutter, i.e. the helicopter is hovering. Range and Doppler ambiguities are related to the PRF of a pulsed Doppler radar. High PRF's provide unambiguous range-rate (Doppler) measurements but only a small window in the time domain for unambiguous range measurements. Low PRF's provide unambiguous range measurements but only a small window in the time domain for unambiguous range-rate measurements. The currently-preferred approach is to select a medium PRF which provides a compromise between range and range-rate measurements. Any PRF pulse-radar, and even a CW radar, can be used as long as the seeker can distinguish the extended rotor return of a helicopter whose body Doppler has merged with clutter and the helicopter features can be calculated. As used herein, the term Doppler map can mean either the RDM or the profile of a CW radar.

As shown in FIG. 3, the PRF provides sufficient range resolution such that the return signal can be range-gated into five range cells 82 and sufficient range-rate resolution such that the range-gated signal is filtered into ten Doppler cells 84 (symmetric about the midpoint of one cycle of the periodic response). The number of cells in this example is arbitrary and only intended to illustrate the attributes of a medium PRF pulsed radar. The helicopter return 86 is located in the middle range gate while the ground clutter 88 spans all of the range gates with varying amplitude (and angle). The body Doppler 90, represented by an "O", is buried within ground clutter and is undetectable. The extended rotor return 92 represented by "X", is distinguishable from the ground clutter.

Figure 4:
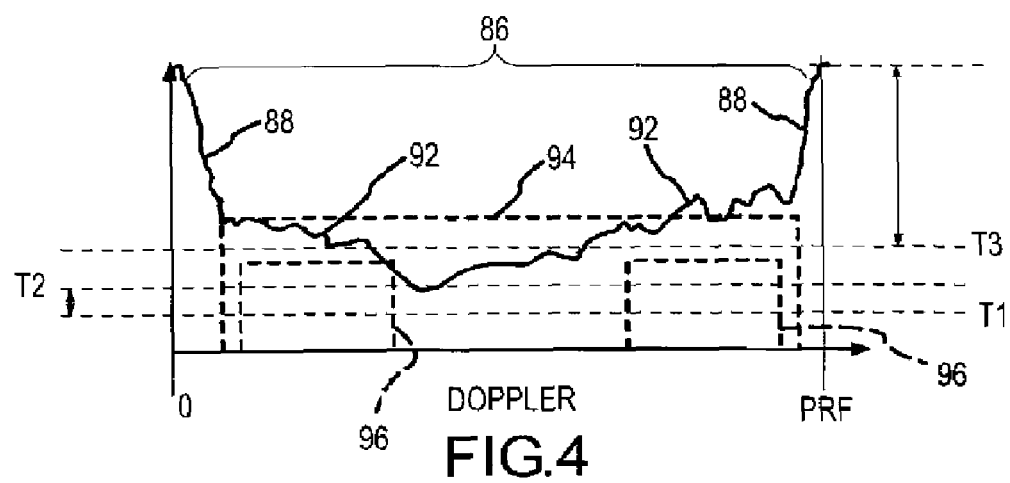
FIG. 4 is a Doppler profile at the helicopter's proper range gate of FIG. 3 overlaid with modified search windows and thresholds for identifying rotor samples in accordance with the present invention.

FIG. 4 is a plot of the amplitude versus Doppler shift of the helicopter return 86 from the middle range gate. Although the body Doppler is buried in the ground clutter 88, the extended rotor return 92, although noisy, is distinguishable from the ground clutter. The first step to extracting any of the features is to identify likely rotor samples. At this point in a conventional pulse-radar, the seeker would have established a search window 94 that excludes the ground clutter and compared each sample within the window against a detection threshold T1 set above the noise floor in order to detect a possible target. The seeker will typically vary T1 over time to maintain a constant false alarm rate as a system constraint, although this is not necessary. The seeker would then process the thresholded samples in an attempt to classify the body Doppler.

Our approach to classifying the rotor Doppler can either use these thresholded samples in the search window as the "rotor samples" or we can further refine the search window and/or amplitude threshold based on the defined attributes of typical rotor assembly returns to improve the identification of rotor samples. In the former case, the extracted features will typically be a bit "noisier" and may require more sophisticated classification to maintain the same level of performance. In the latter case, the extracted features should be more accurate and enable a simple classification algorithm.

As shown in FIG. 4, search window 94 is split into a pair of search windows 96 on either side of the ground clutter 88. The inner edge of search window 96 is set to exclude the ground clutter and body Doppler and the outer edge is set somewhat above the maximum expected Doppler shift for a rotor assembly. In the case where the body Doppler is shifted with respect to the ground clutter and its position is estimated, but not classified, with sufficient confidence, the search window on the side of the body Doppler that includes the ground clutter (as shown in FIG. 7b) is omitted. The remaining search window is shifted by the estimated Doppler shift of the body Doppler.

Amplitude thresholding to identify rotor samples can be modified in a couple of ways. First, a threshold T2 can be set, for example, an increment above CFAR threshold T1, depending on the a priori knowledge of the expected return from a generic rotor assembly or a specific rotor assembly. Second, an additional threshold T3 can be established with respect to the peak of the body Doppler. As mentioned previously, the amplitude range of rotor samples with respect to the body Doppler is typically 12-15 dB down from the peak body return. In some cases, T3 may set a higher threshold than T2 and vice-versa, and this may change with time due to fluctuations in amplitude levels and SNR that vary the CFAR threshold T1. Therefore, the seeker continually determines which threshold is higher and suitably performs a single comparison based on that threshold.

Furthermore, in a typical implementation each "sample" corresponds to a Doppler cell 84. A bandpass filter for that cell receives one or more return samples over a period of time (to improve SNR) and typically outputs an amplitude and angle for that sample. The simplest approach is to average the amplitudes and angles of all the samples. In the typical case where each sample has all angle, if a sufficient number of samples are received, the seeker may be able to prefilter the samples to remove samples associated with outlier angles for each Doppler cell. If the samples are rotor samples then all of the angles should be very nearly the same, and thus any outlier is most likely not a rotor sample.

Figure 5:
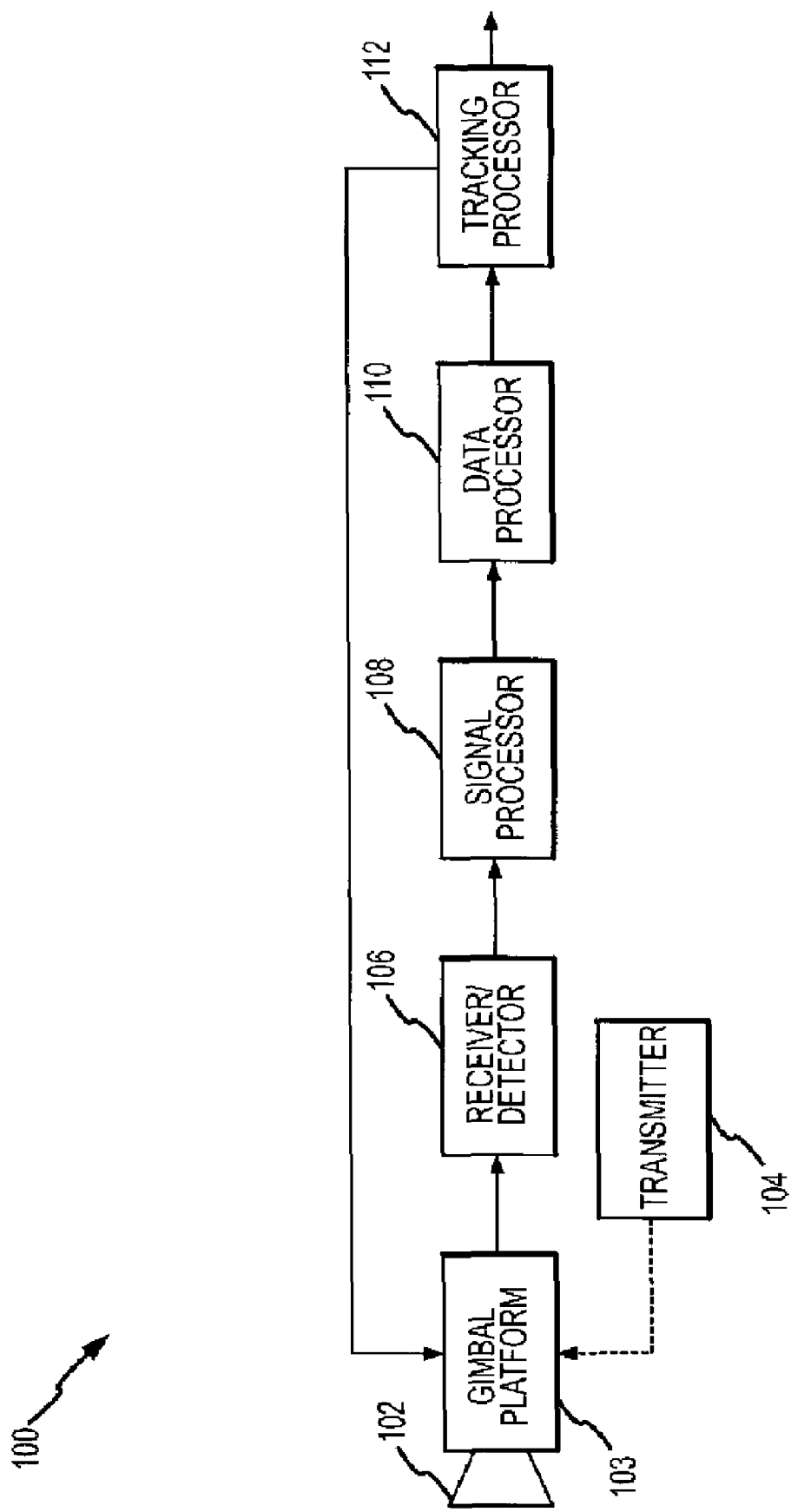
FIG. 5 is a block diagram of an airborne look-down Doppler radar that has been augmented in accordance with the present invention to extract rotor features and classify slow-moving or stationary targets, such as helicopters.
Figure 6:
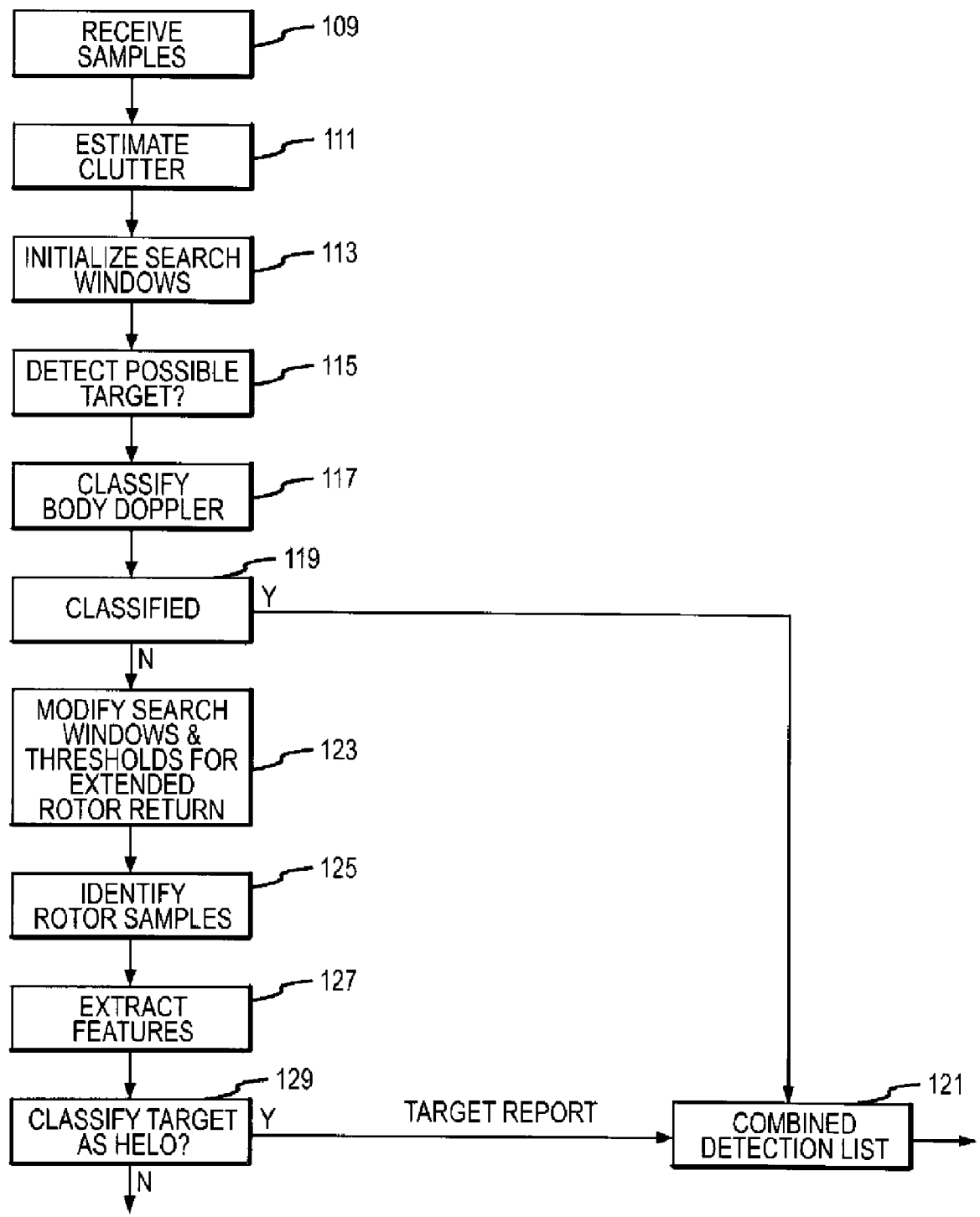
FIG. 6 is a flowchart of an exemplary process for extracting rotor features and classifying potential targets as helicopters.

An exemplary embodiment of an on-board pulsed-radar seeker 100 configured to implement the present invention to detect and classify hovering or slow-moving helicopters are illustrated in FIGS. 5 and 6. Other than modifications to the software implemented in the data processor 110, the seeker is a conventional on-board look-down pulsed-radar system which can extract at least signal amplitude and target Doppler (target speed along the line-of-sight) and preferably target angle. The seeker includes an aperture 102 on a gimbal platform 103 for transmitting electromagnetic (EM) pulses and receiving the return signals. Historically the seeker operates in the X-band of 8-12 GHz but other operating bands can be used as long as the seeker can distinguish the extended rotor return of the helicopter from clutter return. Typically, the seeker is an active system in which a transmitter 104 is included on-board the missile. In some applications, the transmitter could be located elsewhere, in which case the system is considered bistatic.

A receiver/detector 106 converts the returned EM energy into an electrical signal and downconverts the X-band signal to a frequency suitable for the seeker electronics. The return signals are preferably detected coherently in order to provide phase or angle information as well as the amplitude. The receiver/detector maintains a desired constant false-alarm rate (CFAR) by changing threshold T1 to an optimum value over time.

As shown in FIG. 6, the signal processor receives the raw samples (step 109) and estimates clutter (step 111), initializes the search windows to exclude the clutter (step 113), and detects possible targets from the RDM (step 115). The possible targets and ranges are handed off to the data processor 110, which first attempts to classify the targets using conventional body Doppler processing (step 117). If the target is classified as a helicopter (or airplane) with sufficient confidence in the classification, (step 119), the target and estimates of the range and range-rate are added to the combined detection list (step 121), which in turn is handed off to a tracking processor 112. Once hand-off is complete, the tracking processor locks onto the target and maneuvers the missile during terminal guidance to impact.

If the target cannot be detected 115 or classified 117, or if the classification is marginal in step 119, then the data processor implements our invention for detecting and classifying helicopters based on their extended rotor returns. The data processor suitably modifies the search window and thresholds as described above to improve the likelihood of correctly identifying rotor samples (step 123). The data processor then compares each sample where 'sample' is the integrated output of each Doppler band-pass filter provided by the radar, within the search window to the appropriate threshold and identifies it either as a "rotor sample" or other (step 125).

The data processor extracts a set of one Or more features, preferably including at least the "bandwidth" feature and suitably the "activity", "angle" and possibly "shape" features, from the rotor samples (step 127). The bandwidth feature may be calculated in a couple ways. If there are two search windows, the rotor sample having the largest Doppler shift with respect to zero Doppler is chosen from each window. The "bandwidth" is the difference between their Doppler shifts. If there is one search window, the rotor sample having the largest Doppler shift with respect to the estimated body Doppler is chosen. The "bandwidth" is determined by reflecting that rotor sample around the shift of the body Doppler. The "activity" feature is calculated as a ratio of the number of rotor samples to the total number of samples in the search window (s). The "angle" feature is a uniformity or dispersion metric (e.g. standard deviation) that indicates whether the rotor samples originated from a single point (e.g. a helicopter) or from multiple points. The "shape" feature measures the Doppler distribution over the extended rotor return. The "shape" feature is difficult to extract, and thus not a primary discriminator, but it may be used when available. As shown in FIG. 2b, a crowning shape may be pronounced for sufficient Doppler resolutions. The crowning may be obscured if the Doppler bandpass filters cannot resolve individual scatterers.

Once extracted, the data processor classifies the potential target as a helicopter or other based on the extracted rotor features and approximated known attributes of a helicopter rotor assembly (step 129). More specifically, the classifier will compare the extracted bandwidth to a typical range, determine if the activity is high or low, and see if the angle indicates that the rotor samples came from one or multiple sources and whether the shape is similar to an extended rotor return. The classification of the rotor features helps to avoid false alarms.

The classifier can be implemented in a number of different ways. For example, the bandwidth, activity and angle features could be compared to respective thresholds, e.g. a Doppler value calculated from a rotor rotating at a certain speed, a percentage, and a specific uniformity number, respectively, If all three tests are passed. the potential target is classified as helicopter. The threshold can be set for a generic helicopter class, a specific helicopter or possibly adapted during engagement if, for example, the helicopter was classified when moving fast and the missile must reacquire. Alternately, the classifier could be implemented as a weighted combination of the features or as a maximum likelihood ratio. The classifier may also vary (features used, weighting of features) if the body Doppler is completely merged with the clutter (hovering) versus only partially obscured (slowly moving).

In general, if the potential target is classified affirmatively as a helicopter, a target report is created consisting of a classification tag, range, range-rate, and angle. These are added to the combined detection list (step 121), and handed to the tracking processor. Range-rate information is calculated from the correct helicopter range, such as by range differentiation. The ability to robustly classify the helicopter has the added and related benefit of being able to handoff reliable range-rate estimates which do not jump around from dwell-to-dwell or drop out as in conventional processing. Although the tracking processor typically operates independently of the classification process once hand-off is completed, the data processor suitably continues to process data and classify the target in case, for example, the tracking processor breaks track and needs to reacquire.

Figure 7A:
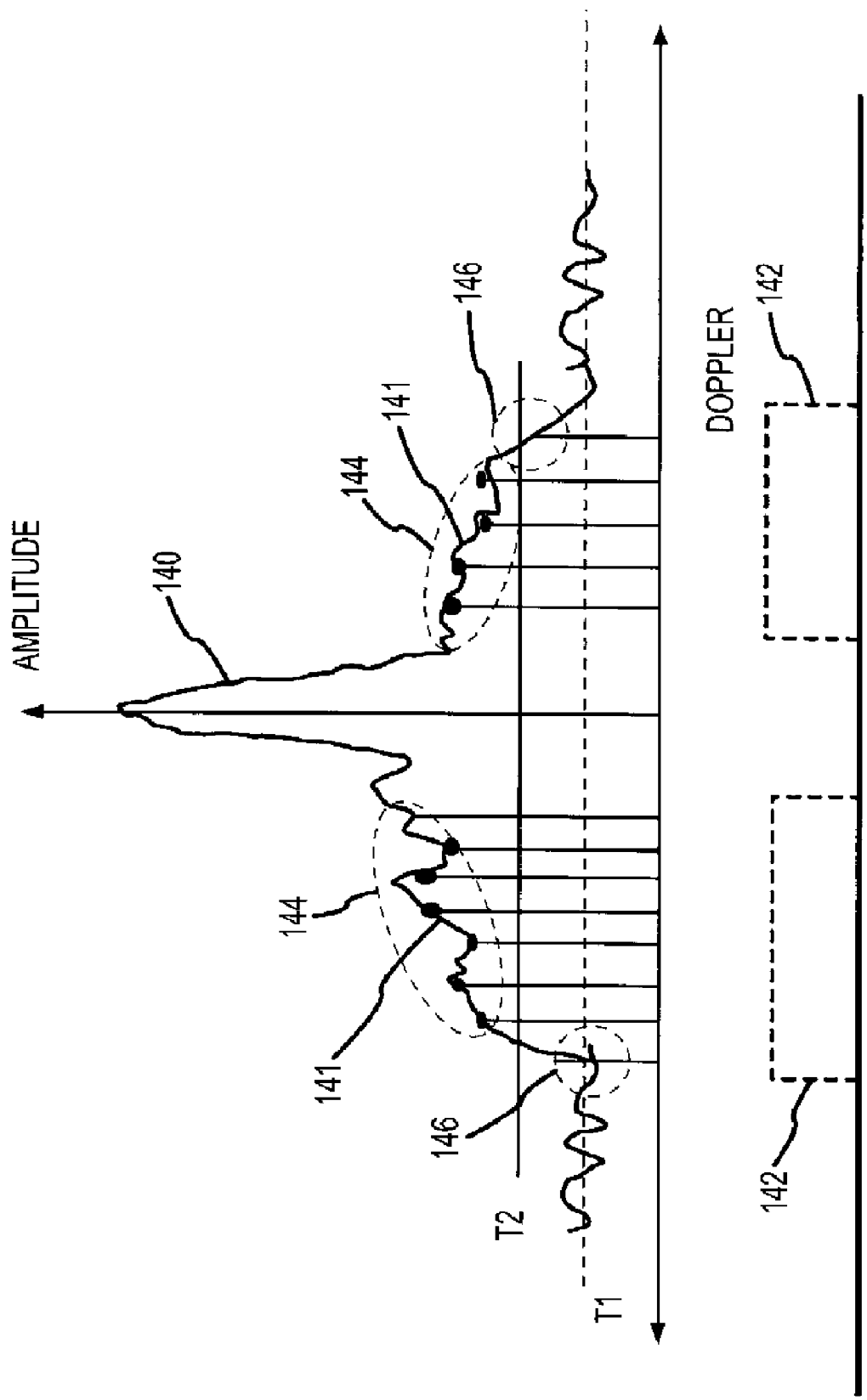
FIGS. 7a and 7b are diagrams showing the thresholds and search windows overlaid on Doppler profiles in which the helicopter's body Doppler has merged with ground clutter and is only partially obscured, respectively.
Figure 7B:
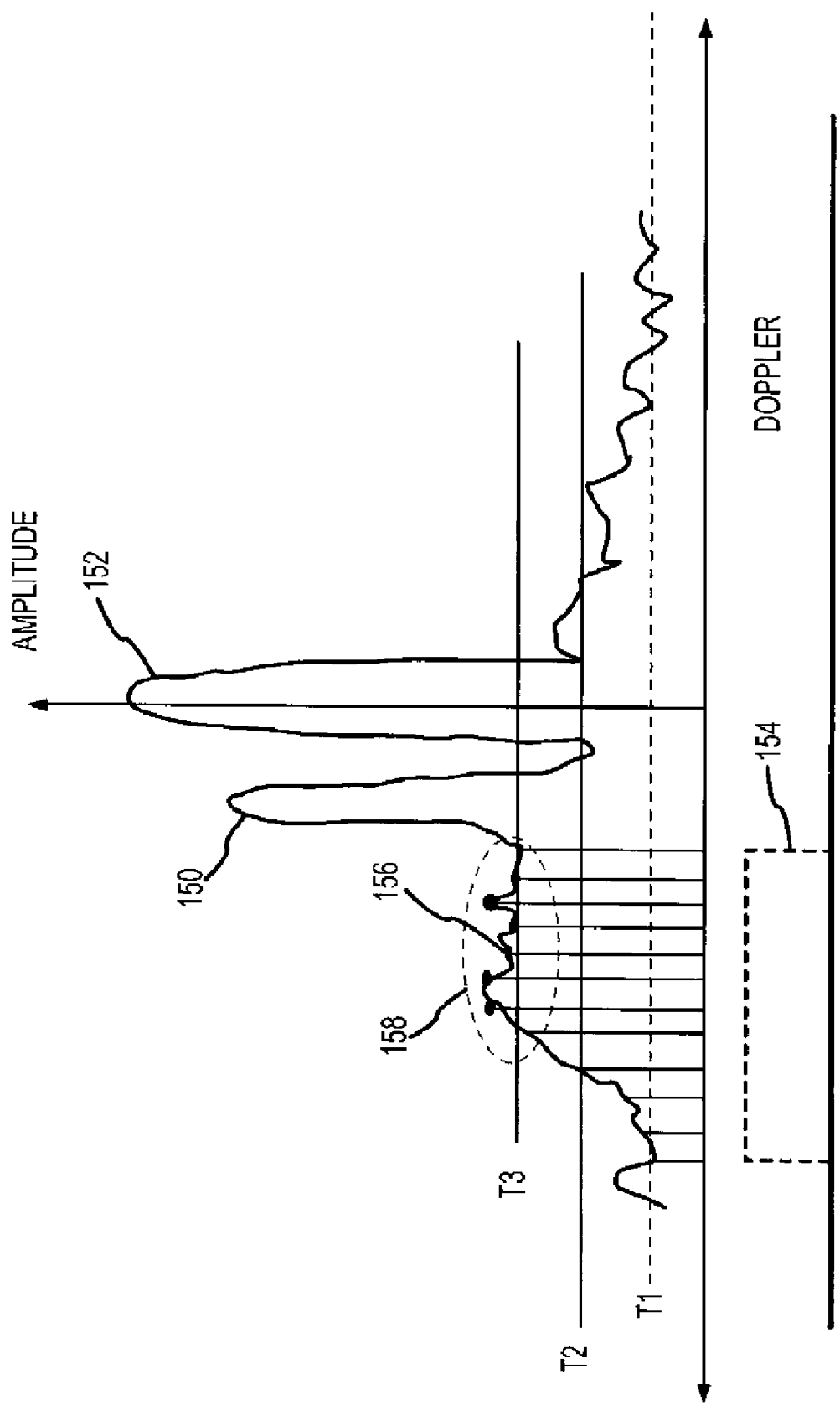

The problem and steps to extract "rotor samples" for hovering and slow-moving helicopters is shown in the realistic Doppler profiles of FIGS. 7a and 7b.

A hovering helicopter is shown in FIG. 7a. As seen in the figure, although the body Doppler has completely merged with the ground clutter 140, the extended rotor return 141 is distinguishable to either side of clutter. A pair of search windows 142 is positioned approximately symmetrically on either side of zero Doppler to exclude the clutter and body returns and to capture samples within a bounded Doppler bandwidth. Because the peak of the body Doppler can not be estimated, the samples within the windows are threshold against T2 to ensure that they are sufficiently above noise floor. Most of the samples exceed T2 and are identified as rotor samples 144. A few samples 146 are too small.

A slow-moving helicopter is shown in FIG. 7b. As shown in the figure, the helicopter's body Doppler 150 is sufficiently obscured by ground clutter 152 to make reliable classification using conventional techniques difficult. Although the body Doppler can be estimated, the Doppler information and associated angle information is highly contaminated by clutter. In this case, a single search window 154 is positioned on the side opposite the ground clutter where the extended rotor return 156 is distinguished. The ground clutter is positioned in the middle of the extended rotor return to the right of the body Doppler rendering it useless. Because an estimate of the body Doppler is available the threshold TS can be used and, in this example, exceeds T2. Again most of the samples exceed T3 and are identified as rotor samples 158.

While several illustrative embodiments of the invention have been shown and described, numerous variations and alternate embodiments will occur to those skilled in the art. For example, the same techniques could be used to classify and track other stationary or slow-moving targets that include some type of rotor scatterer that produces an extended rotor return and can be distinguished from clutter. Such variations and alternate embodiments are contemplated, and can be made without departing from the spirit and scope of the invention as defined in the appended claims.

We claim:

1. A method of missile radar tracking helicopters, comprising:
    receiving on-board missile radar samples having an amplitude and Doppler shift that define a Doppler map including ground clutter, body and extended rotor returns;
    detecting a potential target in the Doppler map;
    defining at least one search window that excludes ground clutter and body returns and includes at least a portion of the extended rotor return;
    setting a threshold above a constant false-alarm rate (CFAR) threshold;
    comparing the samples within said at least one search window to the threshold to identify rotor samples;
    extracting rotor features from the rotor samples; and
    classifying the potential target as a helicopter or other based on the extracted rotor features and known attributes of a helicopter rotor assembly.

2. The method of claim 1, wherein a pair of said search windows are defined to capture portions of the extended rotor return on either side of the clutter return.

3. The method of claim 1, wherein a single said search window is defined to capture a portion of the extended rotor return on the side of the body return opposite the ground clutter.

4. The method of claim 1 wherein at least one search window has a minimum Doppler shift that is set to exclude ground clutter and body returns and a maximum Doppler shift that is set to include the bandwidth of the extended rotor return.

5. The method of claim 1, wherein the threshold is set to the greater of a predetermined increment above the CFAR threshold or a predetermined amount below the peak of the body return.

6. The method of claim 1, wherein the CFAR threshold is varied over time to maintain a constant false-alarm rate.

7. The method of claim 1, wherein the radar samples are extracted from pulses at multiple range gates.

8. The method of claim 1, further comprising:
    providing a target report including a classification tag, a range and a range-rate for the helicopter.

9. A method of missile radar tracking helicopters, comprising:
    receiving on-board missile radar samples having an amplitude and Doppler shift that define a Doppler map including ground clutter, body and extended rotor returns;
    detecting a potential target in the Doppler map;
    identifying rotor samples from samples within the extended rotor return;
    extracting rotor features from the rotor samples including determining a bandwidth of the extended rotor return and determining an activity measure that estimates a fraction of samples within the bandwidth identified as rotor samples; and
    classifying the potential target as a helicopter or other based on the extracted rotor features and known attributes of a helicopter rotor assembly.

10. The method of claim 9, wherein extracting rotor features further includes extracting an angle for each rotor sample.

11. The method of claim 10, wherein extracting rotor features further includes computing a uniformity metric for the angles of the rotor samples.

12. The method of claim 9, wherein extracting rotor features further includes extracting a shape feature of the amplitudes of the rotor samples within the bandwidth of the extended rotor return.

13. A method of missile radar tracking helicopters, comprising:
    receiving on-board missile radar samples having an amplitude and Doppler shift for multiple range gates that define a Range-Doppler Map (RDM) including ground clutter, body and extended rotor returns;
    initializing at least one search window to exclude ground clutter;
    comparing the samples within the at least one search window to a constant false-alarm rate (CFAR) threshold to detect potential targets;
    processing the samples to attempt to extract the body return of the helicopter;
    modifying the at least one search window to exclude the body return and the ground clutter;
    comparing the samples within said at least one modified search window to a threshold set above the CFAR threshold using a priori information of a helicopter rotor assembly to identify rotor samples;
    extracting rotor features including a bandwidth from the rotor samples; and
    classifying the potential target as a helicopter or other based on at least the bandwidth feature and known bandwidths of the helicopter rotor assembly.

14. The method of claim 13, wherein the threshold is the greater of a predetermined amount above the noise floor of the radar or a predetermined amount below the peak of the body return.

15. The method of claim 14, wherein the amount above the noise floor is a predetermined increment above the CFAR threshold.

16. The method of claim 13, herein extracting rotor features further includes determining an activity measure that estimates a fraction of samples within the bandwidth identified as rotor samples.

17. The method of claim 13, wherein extracting rotor features further includes extracting an angle for each rotor sample and computing a uniformity metric for the angles of the rotor samples.

18. A missile radar system for tracking helicopter, comprising:
    an aperture for receiving electromagnetic radiation;
    a receiver configured to convert the electromagnetic radiation into data samples having an amplitude and Doppler shift that define a Doppler map including ground clutter, body and extended rotor returns;
    a signal processor configured to process the data samples to exclude ground clutter and detect a possible target; and
    a data processor configured to set a threshold to the greater of a predetermined increment above a constant false-alarm rate (CFAR) threshold or a predetermined amount below the peak of the body return, compare the data samples to the threshold to identify rotor samples within the extended rotor return, extract rotor features from the rotor samples and classify the potential target as a helicopter or other based on the extracted rotor features.

19. The missile radar system of claim 18, wherein the data processor modifies at least one search window in which to identify rotor samples to exclude the body return and the ground clutter.

20. The missile radar system of claim 18, wherein the predetermined increment is set using a priori information of a helicopter rotor assembly.

21. The missile radar system of claim 19, wherein the data processor extracts a bandwidth feature from the rotor samples.

22. The missile radar system of claim 21, wherein the data processor also extracts at least one of an activity measure that estimates a fraction of samples within the bandwidth identified as rotor samples, a uniformity measure of angles associated with each rotor sample, and a shape measure of the extended rotor return.

23. The missile radar system of claim 19, wherein the data processor creates a target report including a classification tag, range, and range-rate of the extended rotor return.

24. A method of missile radar tracking helicopters, comprising:
  receiving on-board missile radar samples having an amplitude and Doppler shift for multiple range gates that define a Range-Doppler map including ground clutter, body and extended rotor returns;
  initializing at least one search window to exclude ground clutter across all of the range gates;
  comparing the samples within the at least one search window across all range gates in the Range-Doppler map to an initial threshold set above the noise floor to detect a potential target at a range gate;
  modifying the at least one search window for said range gate to exclude ground clutter and body returns and include at least a portion of the extended rotor return;
  setting a detection threshold above the initial threshold;
  comparing the samples within said at least one modified search window for said range gate to the detection threshold to identify rotor samples;
  extracting rotor features from the rotor samples; and
  classifying the potential target as a helicopter or other based on the extracted rotor features and known attributes of a helicopter rotor assembly.

25. The method of claim 24, wherein the initial threshold varies over time with changes in the noise floor, said detection threshold set at a fixed increment above the initial threshold.

26. The method of claim 24, wherein the initial threshold is a constant false-alarm rate (CFAR threshold) that varies over time maintain an approximately CFAR.

27. The method of claim 24, wherein the detection threshold is set a predetermined amount below the peak of the body return.

28. The method of claim 24, wherein a single said search window is modified to capture a portion of the extended rotor return on the side of the body return opposite the ground clutter.

29. The method of claim 24, wherein the extraction of rotor features from the rotor samples comprises:
  extracting a bandwidth feature that estimates the bandwidth of the extended rotor return;
  determining an activity measure that estimates a fraction of samples within the bandwidth identified as rotor samples; and
  extracting an angle for each rotor sample and computing a uniformity metric for the angles.

* * * * *